Aug. 19, 1941.  H. L. BONE ET AL  2,253,058
DRIVE MECHANISM FOR AXLE DRIVEN SPEED RESPONSIVE
DEVICES FOR RAILWAY TRAINS
Filed Aug. 2, 1940

INVENTORS
Herbert L. Bone and
John W. Livingston.
THEIR ATTORNEY

Patented Aug. 19, 1941

2,253,058

UNITED STATES PATENT OFFICE 2,253,058

DRIVE MECHANISM FOR AXLE DRIVEN SPEED RESPONSIVE DEVICES FOR RAILWAY TRAINS

Herbert L. Bone and John W. Livingston, Forest Hills, Pa., assignors to The Union Switch & Signal Company, Swissvale, Pa., a corporation of Pennsylvania Application August 2, 1940, Serial No. 349,816

1 Claim. (Cl. 74—12)

Our invention relates to drive mechanisms for axle driven speed responsive devices for railway trains.

One object of our invention is to provide a drive mechanism which will enable the speed responsive device to be mounted adjacent to, and driven from, the end of an axle of a modern light weight high speed train.

Another object of our invention is to provide a drive mechanism including a drive shaft which can be inserted or removed to connect the speed responsive device with, or disconnect it from, the associated axle without the necessity for removing the speed responsive device as a whole from the train.

According to our invention, the drive shaft is operatively connected at one end with a vehicle axle by any suitable connecting means which will cause the drive shaft to rotate in response to rotation of the axle, but which will allow a limited amount of angularity between the axle and the drive shaft. The other end of the drive shaft is formed with an enlarged head which extends with clearance into the hub of a driving gear of the speed responsive device. The enlarged head is provided with two diametrically opposite outwardly projecting pins or trunnions extending at right angles to the axis of the shaft and with spherical bearing surfaces on opposite sides of the pins in the direction of the axis of the shaft. The bearing surfaces cooperate with correspondingly shaped bearing surfaces formed in the confronting end faces of two bearing members secured within the opposite ends of the gear hub, while the trunnions cooperate with slots formed in the one bearing member. The parts are so proportioned that the shaft is free to rock in both directions from the position in which its axis is parallel to the axis of the gear, but that end play between the shaft and the gear wheel is prevented and that the gear wheel is constrained to rotate in response to rotation of the shaft. The one bearing member is removable, and the parts are further so proportioned that by removing this member, the drive shaft can be removed from the governor and the axle to facilitate installation, testing, inspection, etc.

Other objects and characteristic features of our invention will appear as the description proceeds.

We shall describe one form of drive mechanism embodying our invention, and shall then point out the novel features thereof in the claim.

Figure 1:
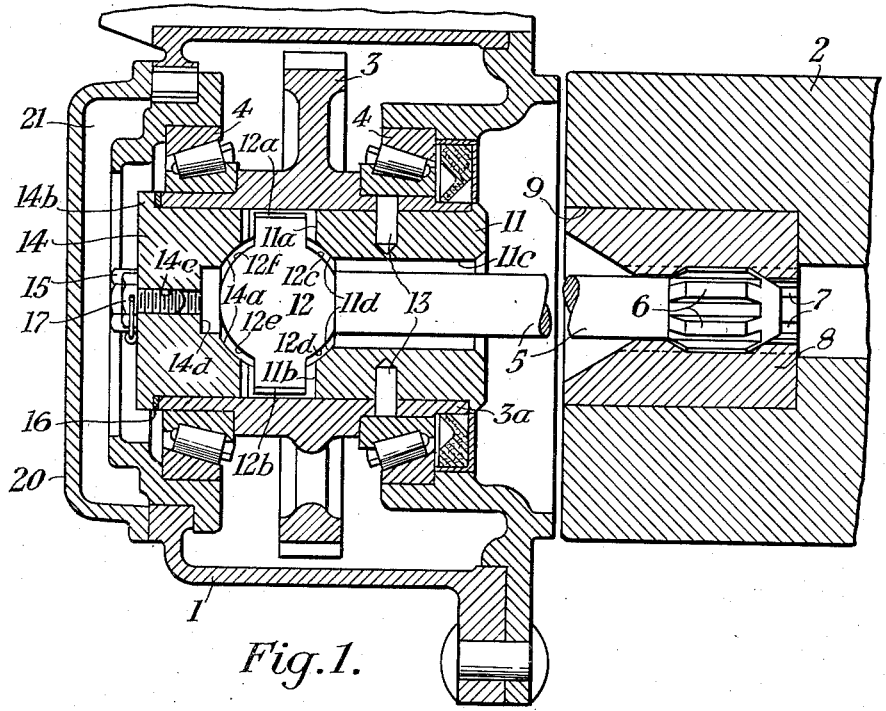
Figure 2:
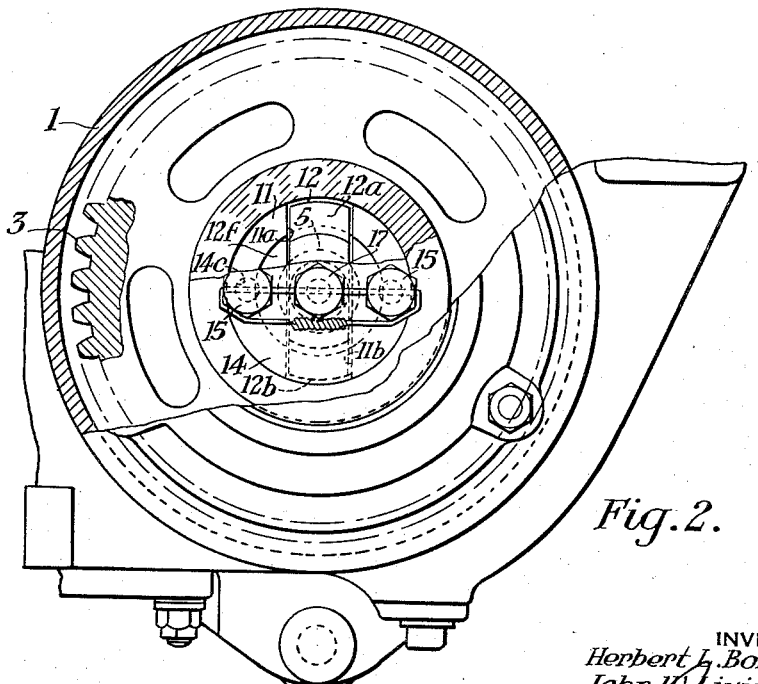

In the accompanying drawing, Fig. 1 is a longitudinal sectional view showing one form of drive mechanism embodying our invention for connecting a speed responsive device with a vehicle axle. Fig. 2 is a left-hand end view of the gear wheel and some of the associated parts shown in Fig. 1, certain of the parts being broken away and others shown in cross section to better illustrate the construction of the remaining parts.

Referring to the drawing, the reference character 1 designates a housing which is adapted to be secured in any suitable manner not shown to the journal box of a railway vehicle adjacent one end of one of the axles 2 of the vehicle. This housing may contain any desired mechanism which it is desired to operatively connect with the axle 2, such for example, as a speed responsive device of the type shown and described in our prior application for Letters Patent of the United States, Serial No. 205,276, filed on April 30, 1938, for Speed responsive device, and as here illustrated this housing contains a gear 3 journaled in roller bearings 4 and disposed in axial alignment with the axle 2. It will be understood that this gear 3 forms a part of the driving mechanism for the speed responsive device, and according to our present invention we provide a flexible coupling which we shall now describe for connecting this gear with the axle 2.

The coupling in the form here shown comprises a drive shaft 5 provided at one end with splines 6 which are adapted to slide in longitudinal grooves 7 formed in a plug 8 fitted into a hole 9 bored in the center of the axle 2. The plug 8 is constrained to rotate in response to rotation of the axle, and it will be apparent therefore that the splines and grooves provide a driving connection between the axle and the shaft. The grooves, however, are made sufficiently longer than the splines to enable the shaft to remain in a fixed longitudinal position irrespective of the usual endwise motion of the axle permitted by the axle bearings, and sufficient clearance is provided between the splines and the grooves to enable the shaft to tilt relative to the axle through a limited angular distance in all directions sufficient to take care of any misalignment between the drive shaft and the axle likely to result from the usual manufacturing tolerances or bearing wear.

The other end of the drive shaft 5 extends into the hub 3a of the gear wheel 3 through an opening 11c formed in a bearing member 11, and is provided at its inner end with an enlarged head 12. The head 12 is made flat on two sides, as shown in Fig. 2, and is provided with two integral diametrically opposed outwardly extending lugs or trunnions 12a and 12b which extend into diametrically opposite slots 11a and 11b formed in the inner end face of the bearing member 11. The bearing member 11 is pressed into the inner end of the hub 3a of the gear 3 and is pinned in place by pins 13, and the flat sides of the trunnions cooperate with the opposed flat parallel faces of the slots to transmit the torque from the shaft 5 to the gear, as will appear somewhat more fully hereinafter.

The head 12 is also provided on the side where it joins the shaft with spherical bearing surfaces 12c and 12d which cooperate with a spherical seat 11d formed in the inner end of the bearing member 11 between the inner ends of the slots 11a and 11b and the opening 11c, and on its opposite sides with two other spherical bearing surfaces 12e and 12f which cooperate with a spherical seat 14a formed in the inner end of a bearing cap 14 disposed in the outer end of the gear hub. The bearing cap is secured to the bearing member 11 by means of studs 15 which pass through clearance holes in the bearing cap and are screwed into tapped holes formed in the bearing member on opposite sides of the head 12 in the direction of its flat sides, and is made adjustable by means of one or more shims 16 which surround the bearing member between the outer end of the hub and an annular flange 14b provided on the bearing cap 14. The bearing cap is so adjusted that endwise movement of the shaft relative to the gear is prevented, but that the head of the shaft is free to rotate relative to the gear in both directions from the position in which the axis of the shaft coincides with the axis of the gear through a sufficient distance to take care of any misalignment which might occur between the axis of the axle and the axis of the gear. In order to permit the necessary rotation of the head within the gear clearance is provided between the shaft and the opening 11c in the bearing member 11, and clearance is also provided between the trunnions and the sides and both ends of the slots 11a and 11b.

To permit lubrication of the joint formed by the head and the bearing members a threaded axial hole 14c is provided in the bearing member which hole communicates at its inner end with a rectangular recess 14d formed in the inner face of the bearing cap 14 at the center of the bearing seat 14a. The hole 14c is normally closed by a stud 17, which stud when it is desired to remove the bearing cap may be screwed outwardly partway to provide a means for gripping the bearing member to facilitate its removal.

It should be particularly pointed out that the opening 11c in the bearing member 11 through which the shaft 5 extends is sufficiently large in diameter to clear the splines 6 provided on the inner end of the drive shaft, whereby by first removing the bearing cap 14, the shaft 5 may be removed and replaced while the governor is in place on the vehicle. Access to the bearing cap is provided by means of a removable plate 20 secured to the outer end of the housing in a position to cover an opening 21 formed therein.

One advantage of a flexible coupling embodying our invention is that by first removing the drive shaft and then inserting suitable drive mechanism into the outer end of the hub of the gear 3, the governor can be tested without the necessity for removing it from the vehicle.

Another advantage of a coupling embodying our invention is that it facilitates mounting the governor on the vehicle since the drive shaft need not be inserted until after the governor is in place.

A further advantage of a coupling embodying our invention is that it requires a minimum amount of space, is relatively inexpensive to manufacture, and provides a rugged structure which is capable of operating without excessive wear over a relatively long period of time.

Although we have herein shown and described only one form of drive mechanism embodying our invention, it is understood that various changes and modifications may be made therein within the scope of the appended claim without departing from the spirit and scope of our invention.

Having thus described our invention, what we claim is:

In combination with a vehicle axle, a member adapted to be driven from said axle journaled on the vehicle adjacent one end of said axle and provided with a hub, a drive shaft for driving said driven member disposed coaxially with said driven member and said axle and operatively connected at one end with said axle by means which permits limited axial misalignment of said drive shaft and said axle and extending at the other end with clearance into the hub of said driven member, an enlarged head formed integrally with the free end of said drive shaft within said hub, said head being provided with two integral diametrically opposite outwardly projecting trunnions disposed at right angles to the axis of said shaft and with spherical bearing surfaces on opposite sides of said trunnions in the direction of the axis of said shaft, a bearing member secured within the end nearest said axle of the hub of said driven member and provided with an axial opening through which said shaft extends with considerable clearance and in its end face nearest the outer end of said hub with slots which receive said trunnions with sufficient clearance to permit said shaft to rock through a limited distance about the axis of said trunnions and about an axis disposed at right angles to the axis of said trunnions, said bearing member also being provided at the inner ends of said slots with a bearing seat which cooperates with certain ones of the spherical bearing surfaces on said head, and a bearing cap disposed in the other end of the hub of said driven member and secured to said bearing member and provided with a seat which cooperates with the remaining spherical surfaces on said head, said bearing cap being adjusted to prevent longitudinal movement of said shaft relative to said driven member while permitting said shaft to rock about its head, and the parts being so proportioned that when said bearing cap is removed said shaft can be withdrawn from engagement with both said axle and said driven member.

HERBERT L. BONE.
JOHN W. LIVINGSTON.